(12) United States Patent
Mine

(10) Patent No.: US 9,712,753 B2
(45) Date of Patent: Jul. 18, 2017

(54) EXPOSURE CONTROL APPARATUS AND CONTROL METHOD THEREOF, IMAGE CAPTURING APPARATUS, AND STORAGE MEDIUM

(71) Applicant: CANON KABUSHIKI KAISHA, Tokyo (JP)

(72) Inventor: Yosuke Mine, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/881,752

(22) Filed: Oct. 13, 2015

(65) Prior Publication Data

US 2016/0112620 A1    Apr. 21, 2016

(30) Foreign Application Priority Data

Oct. 20, 2014  (JP) ................................. 2014-213982

(51) Int. Cl.
*H04N 5/235*  (2006.01)
*G03B 7/093*  (2006.01)

(52) U.S. Cl.
CPC .......... *H04N 5/2351* (2013.01); *G03B 7/093* (2013.01); *H04N 5/2354* (2013.01); *H04N 5/2355* (2013.01)

(58) Field of Classification Search
CPC .. H04N 5/2351; H04N 5/2354; H04N 5/2355; G03B 7/093; G03B 7/097
USPC ............... 348/229.1, 362, 364; 369/233, 234
See application file for complete search history.

(56) References Cited

U.S. PATENT DOCUMENTS

| | | | | |
|---|---|---|---|---|
| 2003/0184661 A1* | 10/2003 | Yubata | ................... | H04N 5/235 348/229.1 |
| 2008/0024616 A1* | 1/2008 | Takahashi | ............ | H04N 5/2351 348/221.1 |
| 2013/0002905 A1* | 1/2013 | Takakura | ............... | H04N 5/353 348/231.99 |
| 2015/0036040 A1* | 2/2015 | Konishi | ............... | H04N 5/2352 348/364 |
| 2015/0116538 A1* | 4/2015 | Terauchi | .............. | H04N 5/2355 348/229.1 |

FOREIGN PATENT DOCUMENTS

| | | |
|---|---|---|
| JP | 06-130462 A | 5/1994 |
| JP | 2008-113029 A | 5/2008 |

* cited by examiner

*Primary Examiner* — Nhan T Tran
(74) *Attorney, Agent, or Firm* — Cowan, Liebowitz & Latman, P.C.

(57) ABSTRACT

An exposure control apparatus comprises an acquisition unit including a plurality of pixels that are arranged two-dimensionally, and configured to acquire image data, a compression unit configured to compress the image data and generate compressed data, a calculation unit configured to calculate a first photometric value based on the compressed data, a conversion unit configured to convert the first photometric value into a second photometric value corresponding to the image data before the compression; and an exposure control unit configured to perform exposure control based on the second photometric value.

15 Claims, 14 Drawing Sheets

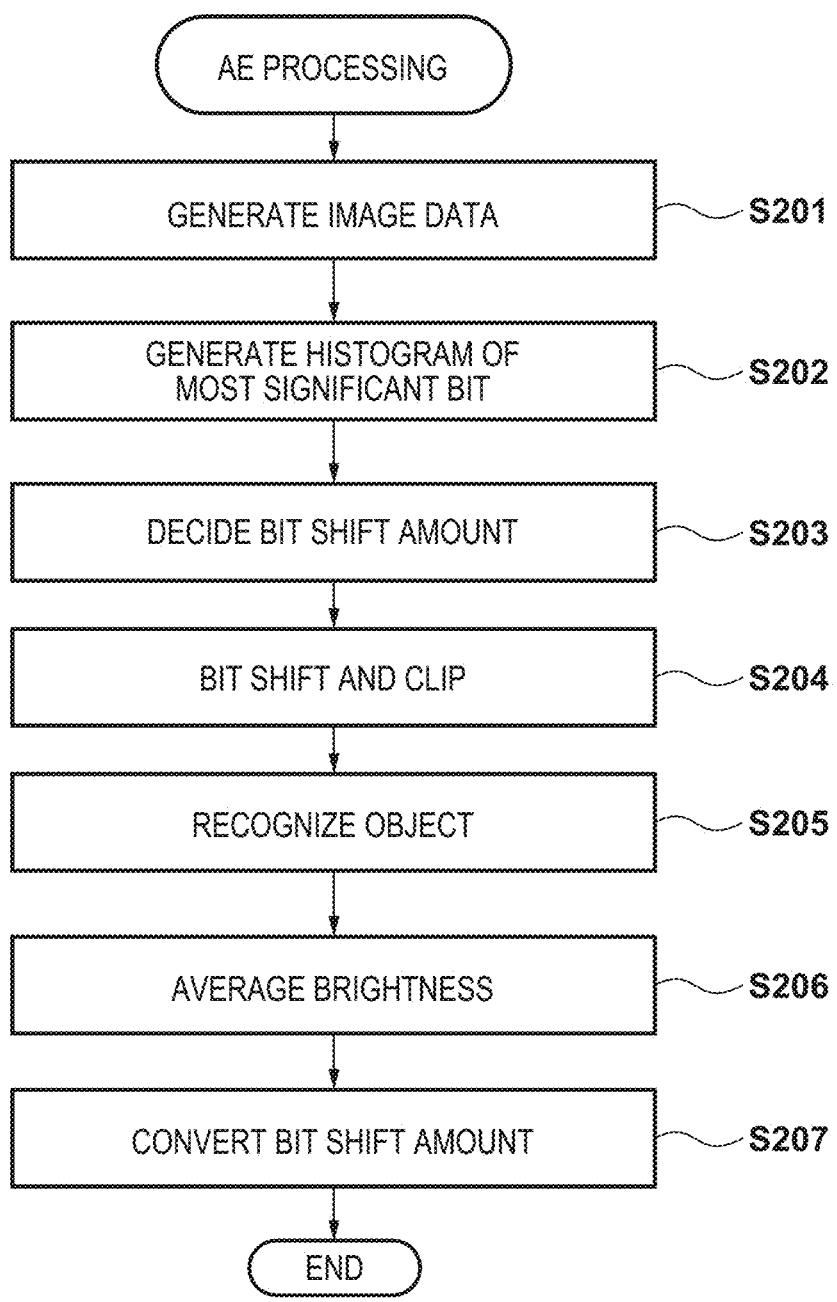

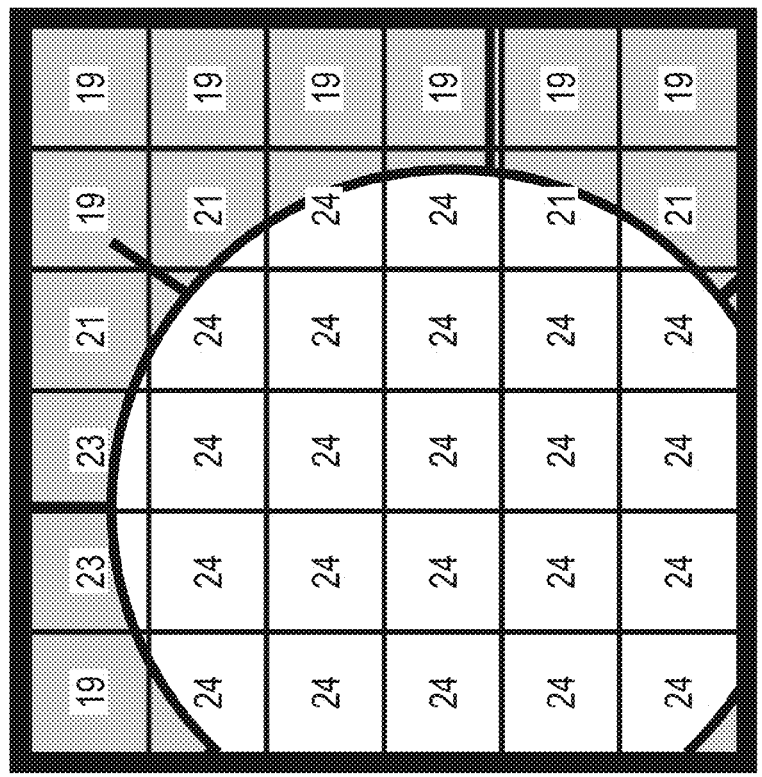

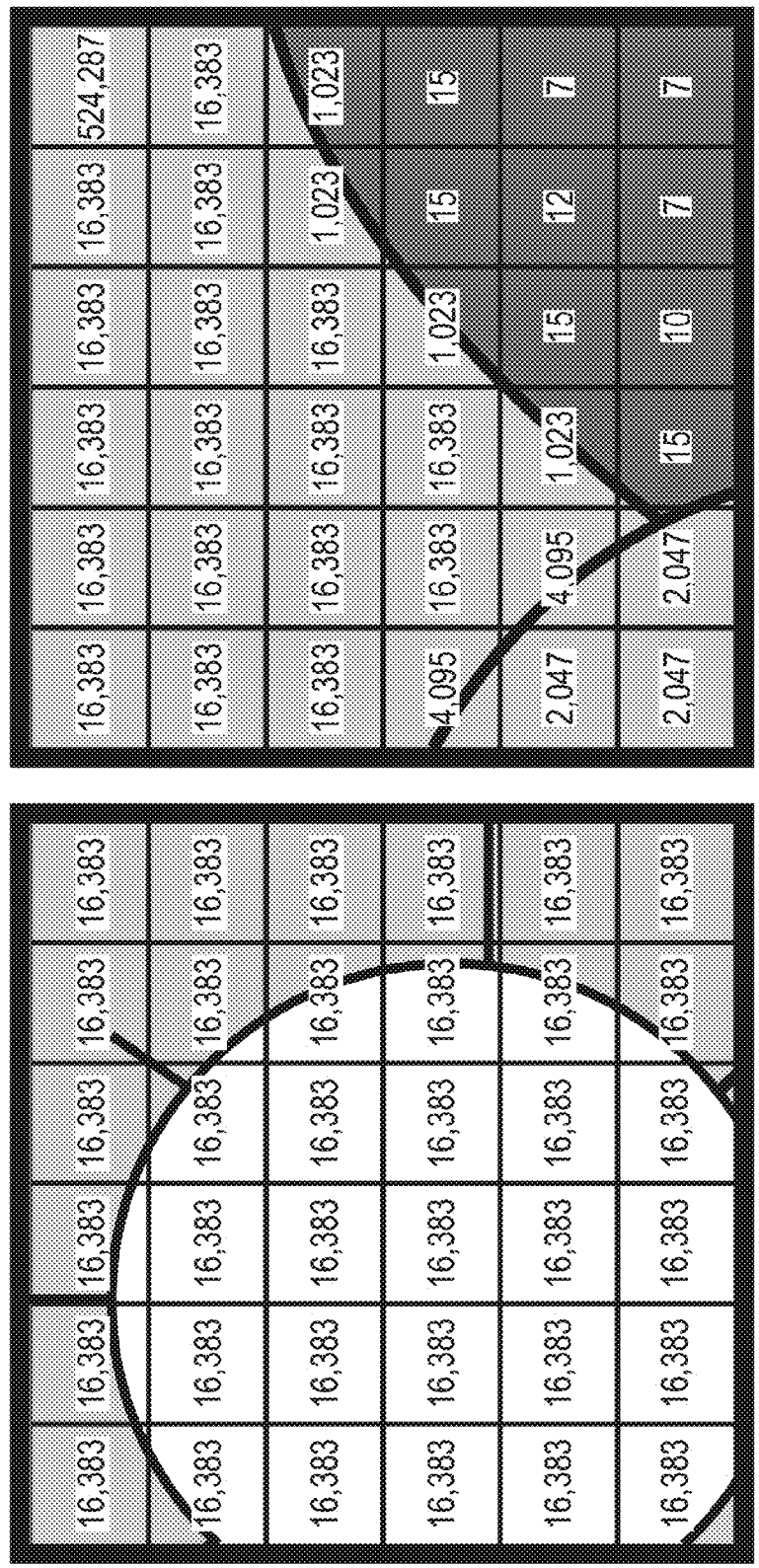

F I G. 4J
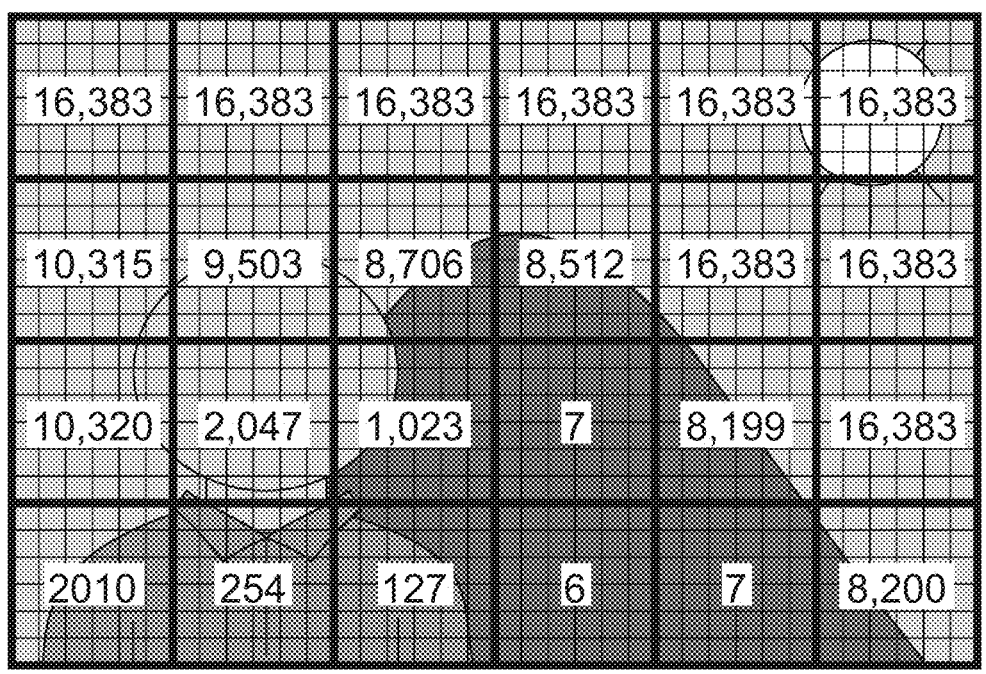

FIG. 5

| BV | PHOTOMETRIC CALCULATION PIXEL OUTPUT |
|---|---|
| -7 | 0 |
| -6 | 1 |
| -5 | 3 |
| -4 | 7 |
| -3 | 15 |
| -2 | 31 |
| -1 | 63 |
| 0 | 127 |
| 1 | 255 |
| 2 | 511 |
| 3 | 1,023 |
| 4 | 2,047 |
| 5 | 4,095 |
| 6 | 8,191 |
| 7 | 16,383 |
| 8 | 32,767 |
| 9 | 65,535 |
| 10 | 131,071 |
| 11 | 262,143 |
| 12 | 524,287 |
| 13 | 1,048,575 |
| 14 | 2,097,151 |
| 15 | 4,194,303 |
| 16 | 8,388,607 |
| 17 | 16,777,215 |

FIG. 6

| LINEAR OUTPUT | | | MOST SIGNIFICANT BIT |
|---:|:---:|---:|---:|
| 0 | ~ | 1 | 1 |
| 2 | ~ | 3 | 2 |
| 4 | ~ | 7 | 3 |
| 8 | ~ | 15 | 4 |
| 16 | ~ | 31 | 5 |
| 32 | ~ | 63 | 6 |
| 64 | ~ | 127 | 7 |
| 128 | ~ | 255 | 8 |
| 256 | ~ | 511 | 9 |
| 512 | ~ | 1,023 | 10 |
| 1024 | ~ | 2,047 | 11 |
| 2048 | ~ | 4,095 | 12 |
| 4096 | ~ | 8,191 | 13 |
| 8192 | ~ | 16,383 | 14 |
| 16384 | ~ | 32,767 | 15 |
| 32768 | ~ | 65,535 | 16 |
| 65536 | ~ | 131,071 | 17 |
| 131072 | ~ | 262,143 | 18 |
| 262144 | ~ | 524,287 | 19 |
| 524288 | ~ | 1,048,575 | 20 |
| 1048576 | ~ | 2,097,151 | 21 |
| 2097152 | ~ | 4,194,303 | 22 |
| 4194304 | ~ | 8,388,607 | 23 |
| 8388608 | ~ | 16,777,215 | 24 |

EXPOSURE CONTROL APPARATUS AND CONTROL METHOD THEREOF, IMAGE CAPTURING APPARATUS, AND STORAGE MEDIUM

BACKGROUND OF THE INVENTION

Field of the Invention

The present invention relates to an exposure control apparatus that performs photometry using a charge-accumulation type image sensor.

Description of the Related Art

A photometry range required of an image capturing apparatus such as a digital camera or digital video camera is generically about −5 to +15 in a BV value of the APEX unit. That is, the dynamic range of the photometry range is about 20 steps. On the other hand, a dynamic range that can be expressed by one accumulation of a charge-accumulation type image sensor is about 10 steps.

There is known a technique of combining image signals obtained by capturing the same scene a plurality of times under different exposure values using a charge-accumulation type image sensor, thereby generating an image having a dynamic range wider than that implemented by one accumulation (image capturing). In general, this technique is called HDR (High Dynamic Range) combination.

For example, in Japanese Patent Laid-Open No. 6-130462, a photometric apparatus using a charge-accumulation type light-receiving element alternately performs photometry with a long charge accumulation time and photometry with a short charge accumulation time, thereby obtaining photometric values from a low brightness portion to a high brightness portion even if the brightness difference in the field is very large.

In Japanese Patent Laid-Open No. 2008-113029, two photoelectric conversion elements of different saturated exposure amounts are used, thereby expanding the dynamic range.

However, when photometric calculation is performed for an image with an expanded dynamic range as described in Japanese Patent Laid-Open Nos. 6-130462 and 2008-113029, the data amount of each pixel output becomes large. When performing integration processing and multiplication processing using the pixel outputs, the circuit scale becomes large, and the processing time is prolonged.

SUMMARY OF THE INVENTION

The present invention has been made in consideration of the above-described problem, and can decrease various kinds of calculation amounts and perform appropriate photometric calculation when performing photometric calculation using an image with an expanded dynamic range.

According to the first aspect of the present invention, there is provided an exposure control apparatus comprising: an acquisition unit including a plurality of pixels that are arranged two-dimensionally, and configured to acquire image data; a compression unit configured to compress the image data and generate compressed data; a calculation unit configured to calculate a first photometric value based on the compressed data; a conversion unit configured to convert the first photometric value into a second photometric value corresponding to the image data before the compression; and an exposure control unit configured to perform exposure control based on the second photometric value.

According to the second aspect of the present invention, there is provided an image capturing apparatus comprising: an acquisition unit including a plurality of pixels that are arranged two-dimensionally, and configured to acquire image data; a compression unit configured to compress the image data and generate compressed data; a calculation unit configured to calculate a first photometric value based on the compressed data; a conversion unit configured to convert the first photometric value into a second photometric value corresponding to the image data before the compression; an exposure control unit configured to perform exposure control based on the second photometric value; and an image capturing unit configured to capture an object image under exposure control by the exposure control unit.

According to the third aspect of the present invention, there is provided a control method of an exposure control apparatus including an acquisition unit including a plurality of pixels that are arranged two-dimensionally, and configured to acquire image data, comprising: compressing the image data and generating compressed data; calculating a first photometric value based on the compressed data; converting the first photometric value into a second photometric value corresponding to the image data before the compression; and performing exposure control based on the second photometric value.

Further features of the present invention will become apparent from the following description of exemplary embodiments with reference to the attached drawings.

BRIEF DESCRIPTION OF THE DRAWINGS

FIG. 3 is a flowchart for explaining photometric processing according to the first embodiment;

FIGS. 4A to 4J are views showing an example of a shooting scene according to the first embodiment;

FIG. 5 is a view showing the relationship between BV values and pixel outputs of a 24-bit high dynamic range image;

FIG. 6 is a view showing the relationship between photometric calculation pixel output and most significant bits;

DESCRIPTION OF THE EMBODIMENTS

The embodiments of the present invention will now be described in detail with reference to the accompanying drawings.

First Embodiment

Figure 1:
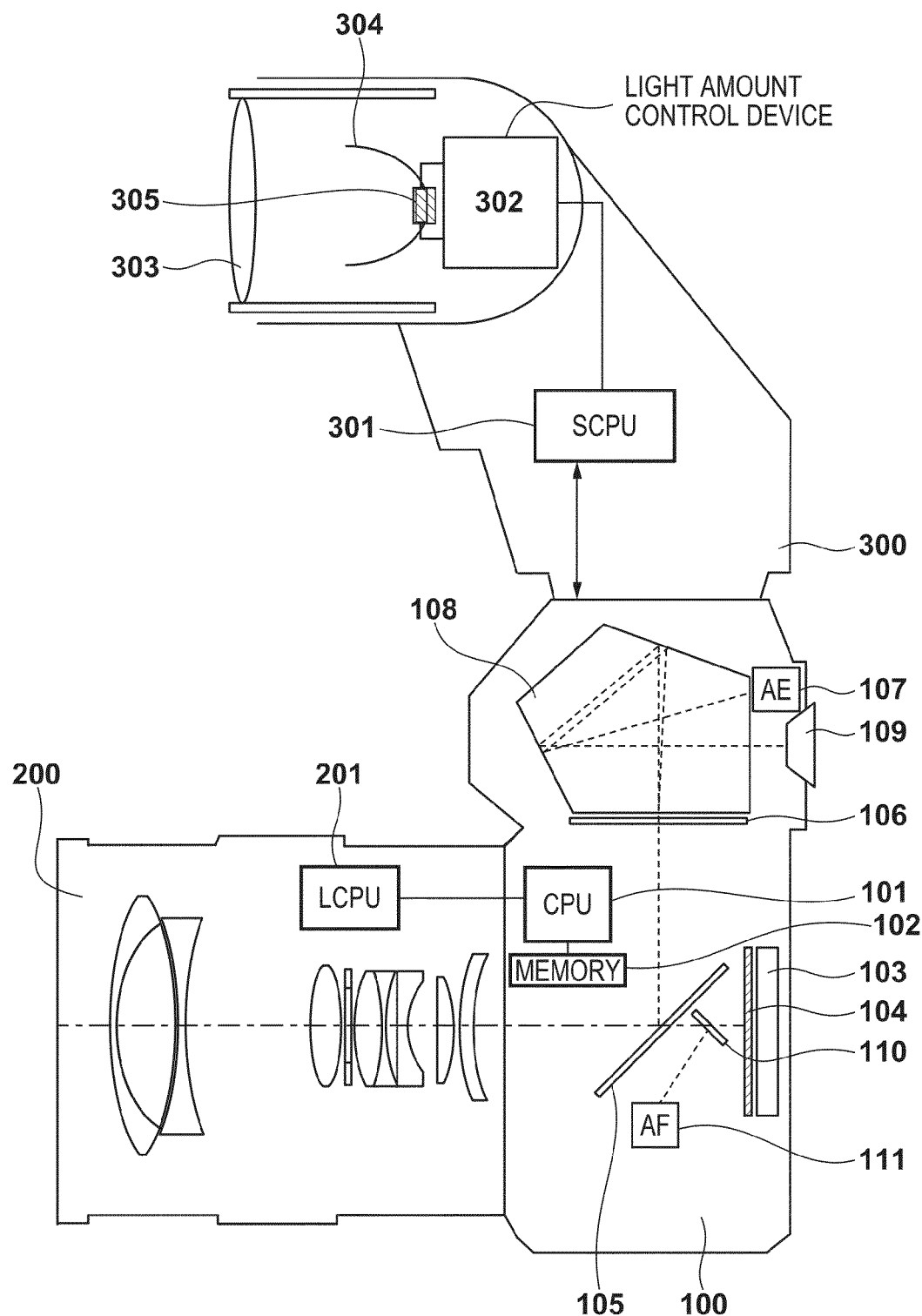
FIG. 1 is a block diagram showing the arrangement of an image capturing apparatus according to the first embodiment of the present invention.

FIG. 1 is a block diagram showing the arrangement of an image capturing apparatus according to the first embodiment of the present invention. Referring to FIG. 1, reference numeral 100 denotes a camera body; 200, a photographing lens; and 300, a flash. Note that the image capturing apparatus may be a digital still camera, digital video camera, smartphone, tablet terminal, or the like having an arrangement different from that shown in FIG. 1.

The arrangements of the camera body 100 and the photographing lens 200 will be described first with reference to FIG. 1. In the camera body 100, a CPU (to be referred to as a camera microcomputer hereinafter) 101 is formed from a microcomputer that controls each unit of the camera body 100. A memory 102 such as a RAM or ROM is connected to the camera microcomputer 101. An image sensor 103 is, for example, a CCD or CMOS sensor including an infrared cut filter, a low-pass filter, or the like. An object image is formed on the imaging plate of the image sensor 103 by the photographing lens 200. A shutter 104 blocks light to the image sensor 103 at the time of non-shooting, and opens to guide a light beam to the image sensor 103 at the time of shooting.

A half mirror 105 reflects some components of light that has entered from the photographing lens 200 at the time of non-shooting, and forms an image on a focus plate 106. A photometric sensor 107 performs object recognition processing such as photometric processing, face detection calculation, or tracking processing using an image sensor such as a CCD or CMOS sensor in which pixels are two-dimensionally arranged.

Note that if a conventional sensor that is not a charge-accumulation type area sensor is used as the photometric sensor, the dynamic range of photometry is 20 or more steps, meeting the dynamic range required of the image capturing apparatus. On the other hand, in the photometric sensor used in this embodiment, which uses a charge-accumulation type area image sensor such as a CCD or CMOS sensor, the dynamic range is about 10 steps, that is, narrower than that of the conventional photometric sensor. The area sensor having a narrow dynamic range is used as the photometric sensor because the image information of a field can be obtained using an area sensor, and face detection processing or object tracking processing can therefore be performed using only the output from the photometric sensor, as described above. In this embodiment, high dynamic range processing (to be described later) is performed for an image obtained by the photometric sensor 107 so as to ensure a dynamic range necessary for the image capturing apparatus using the area type photometric sensor 107.

A pentaprism 108 guides the object image on the focus plate 106 to the photometric sensor 107 and an optical viewfinder 109. The photometric sensor 107 obliquely views, via the pentaprism, the object image formed on the focus plate 106. An AF mirror 110 guides, to an AF sensor 111 in a focus detection circuit, some components of a light beam that has entered from the photographing lens 200 and passed through the half mirror 105. The focus detection circuit performs focus detection using the light beam. An LCPU (to be referred to as a lens microcomputer hereinafter) 201 is a microcomputer in the lens, and sends distance information with respect to the object to the camera microcomputer 101.

The arrangement of the flash 300 will be described next. An SCPU (to be referred to as a flash microcomputer hereinafter) 301 is a microcomputer that controls each unit of the flash 300. A light amount control device 302 includes a boost circuit configured to boost a battery voltage to turn on a light source 305 (to be described later), and a current control circuit configured to control the start and stop of light emission. A zoom optical system 303 includes a panel such as a Fresnel lens and changes the irradiation angle of the flash 300. A reflector 304 condenses a light beam emitted by the light source 305 and irradiates the object with the light beam. The light source 305 is formed from a xenon tube or white LED. The arrangement of the image capturing apparatus shown in FIG. 1 has been described above.

The operation of the camera body 100 will be described next with reference to the flowcharts shown in FIGS. 2 and 3. Note that it is assumed here that the camera body 100 is powered on and set in an image capturing standby state in the initial state.

In step S101, the camera microcomputer 101 determines whether the first stroke (to be referred to as SW1 hereinafter) of the shutter switch is turned on. If the shutter switch SW1 is on, the process advances to step S102. In step S102, the camera microcomputer 101 drives the photometric sensor 107 and performs various kinds of calculations such as photometry. Note that details of the various kinds of calculations will be described later with reference to FIG. 3.

In step S103, the camera microcomputer 101 performs AF (Auto Focus) processing of a known phase difference method. The camera microcomputer 101 detects the defocus amount, drives the focus lens of the photographing lens 200 via the lens microcomputer 201, and drives the focus lens by an amount corresponding to the detected defocus amount.

In step S104, the camera microcomputer 101 determines whether the second stroke (to be referred to as SW2 hereinafter) of the shutter switch is turned on. If the shutter switch SW2 is off, the camera microcomputer 101 confirms the state of the shutter switch SW1 in step S105. If the shutter switch SW1 remains on, the process returns to step S102. If the shutter switch SW1 is turned off, the process returns to step S101.

If the shutter switch SW2 is on in step S104, in step S106, the camera microcomputer 101 executes shooting processing based on exposure control values calculated by the photometric processing of step S102.

Figure 2:
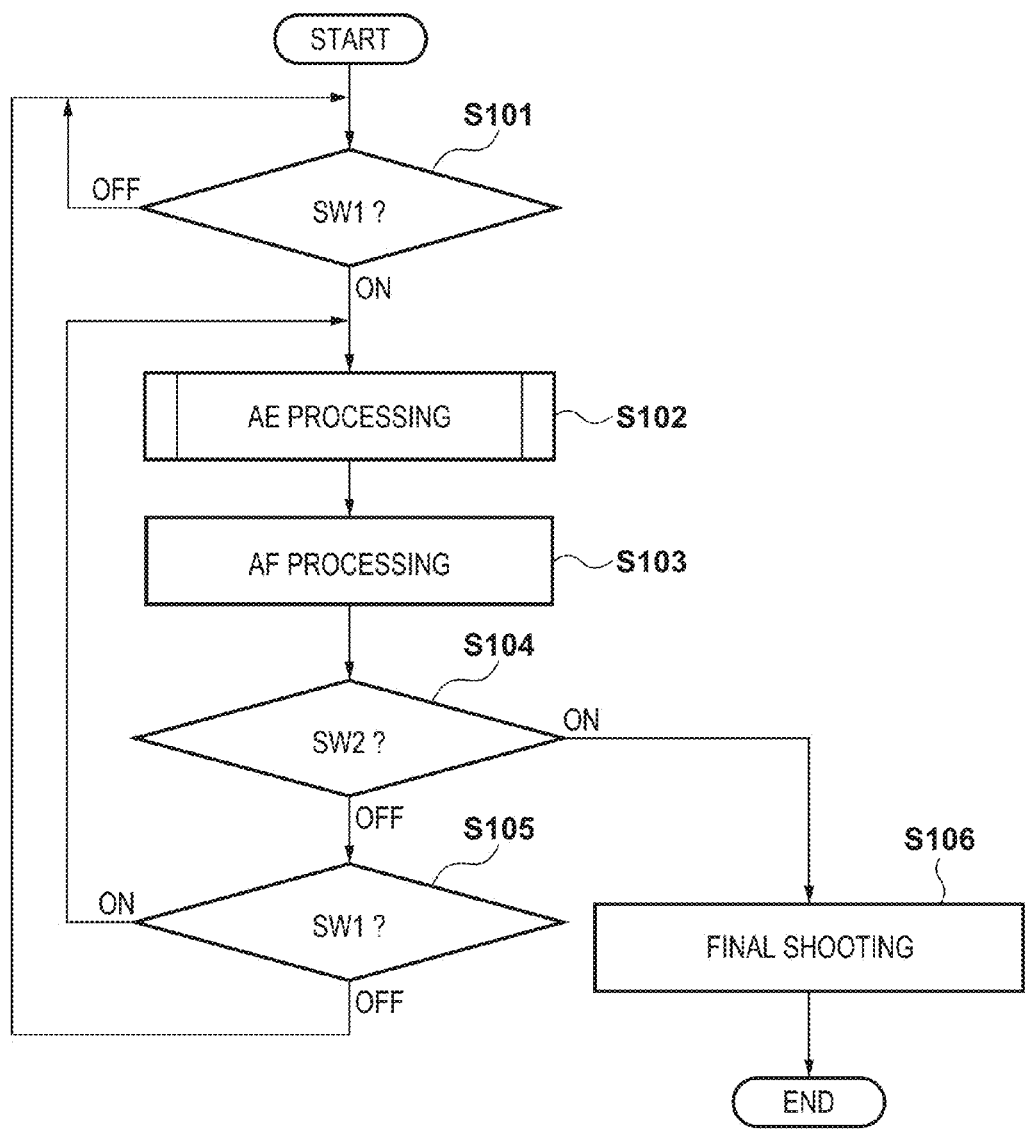
FIG. 2 is a flowchart for explaining shooting processing according to the first embodiment.

FIG. 3 is a flowchart showing details of the photometric processing of step S102 in FIG. 2. The flowchart of FIG. 3 will be described with reference to FIGS. 4A to 9.

Figure 4A:
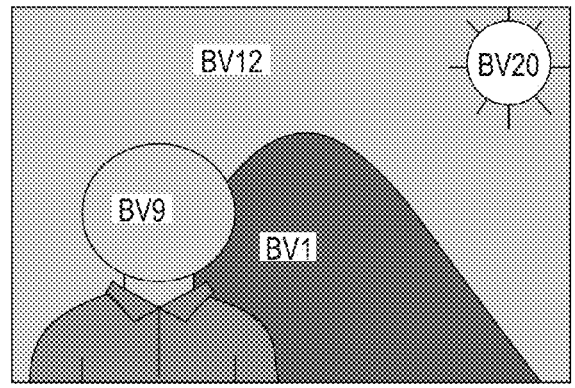

FIG. 4A is a view showing an example of a shooting scene. As for brightness represented by a BV value in the APEX unit, the mountain portion has BV 1, the face portion has BV 9, the sky portion has BV 12, and the sun portion has BV 20.

In step S201, the camera microcomputer 101 decides the accumulation time (TV) of the photometric sensor 107, performs photometry accumulation processing, generates image data, and saves it in the memory 102. The image data is assumed to be a 24-bit high dynamic range image after optical correction by a lens and the like. Note that the optical correction method of the lens and the like is not directly relevant to the embodiment, and a detailed description thereof will be omitted. As a method of generating an image (high dynamic range image) with an expanded dynamic range, a method of capturing a plurality of images under different exposure values by a plurality of times of exposure and combining them can be considered. A method of forming each pixel of the photometric sensor by at least two types of pixel regions, that is, a low sensitivity pixel region and a high sensitivity pixel region and generating an image with an expanded dynamic range by one exposure is also considerable. As a method of capturing a plurality of images and combining them, a method of weighting and adding the pixel outputs of a plurality of images on a pixel basis or a method of selecting the pixel outputs of a plurality of images on a pixel basis in accordance with the brightness of the object can be considered. As the method of forming each pixel of the photometric sensor by two types of pixel regions and thus generating an image with an expanded dynamic range as well, a method of weighting and adding the outputs of the two types of pixel regions on a pixel basis or a method of selecting the output of one of the pixel regions on a pixel basis in accordance with the brightness of the object can be considered. However, the method of generating an image with an expanded dynamic range is not limited to these methods. In this embodiment, for example, the method of forming each pixel of the photometric sensor 107 by two types of pixel regions and selecting the output of one of the pixel regions on a pixel basis in accordance with the brightness of the object is used. The sensitivity of the low sensitivity pixel region and the high sensitivity pixel region of each pixel of the photometric sensor 107 are set so as to enable photometry from BV −7 to BV 16, as shown in FIG. 5.

FIG. 5 is a correspondence table of BV values and the pixel outputs of the 24-bit high dynamic range image. As is apparent from FIG. 5, the photometric sensor 107 can perform photometry from BV −7 to BV 16, covering the photometry range (BV −5 to BV 15) required of the image capturing apparatus. The pixel outputs are 0 to 16,777,215.

Figure 4B:
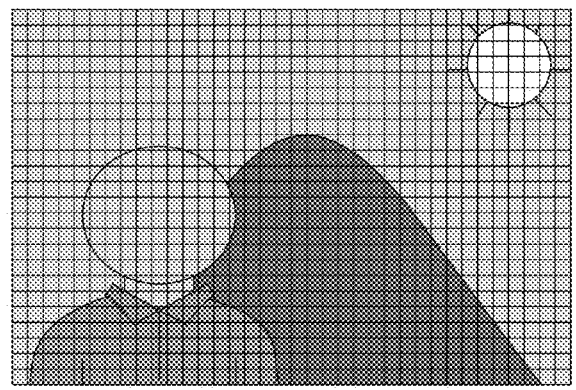
Figure 4C:
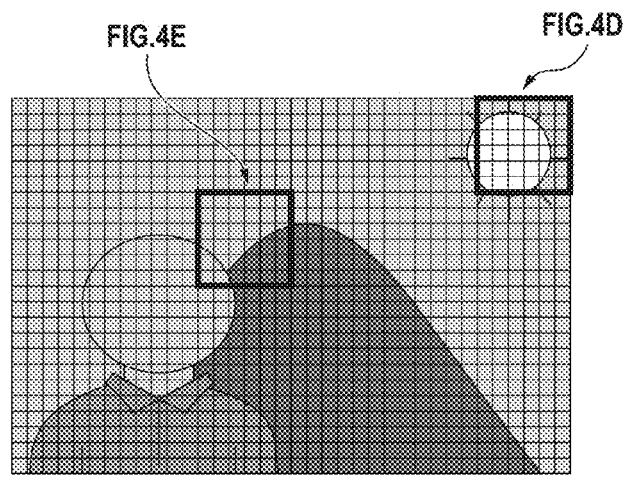
Figures 4D, 4E:
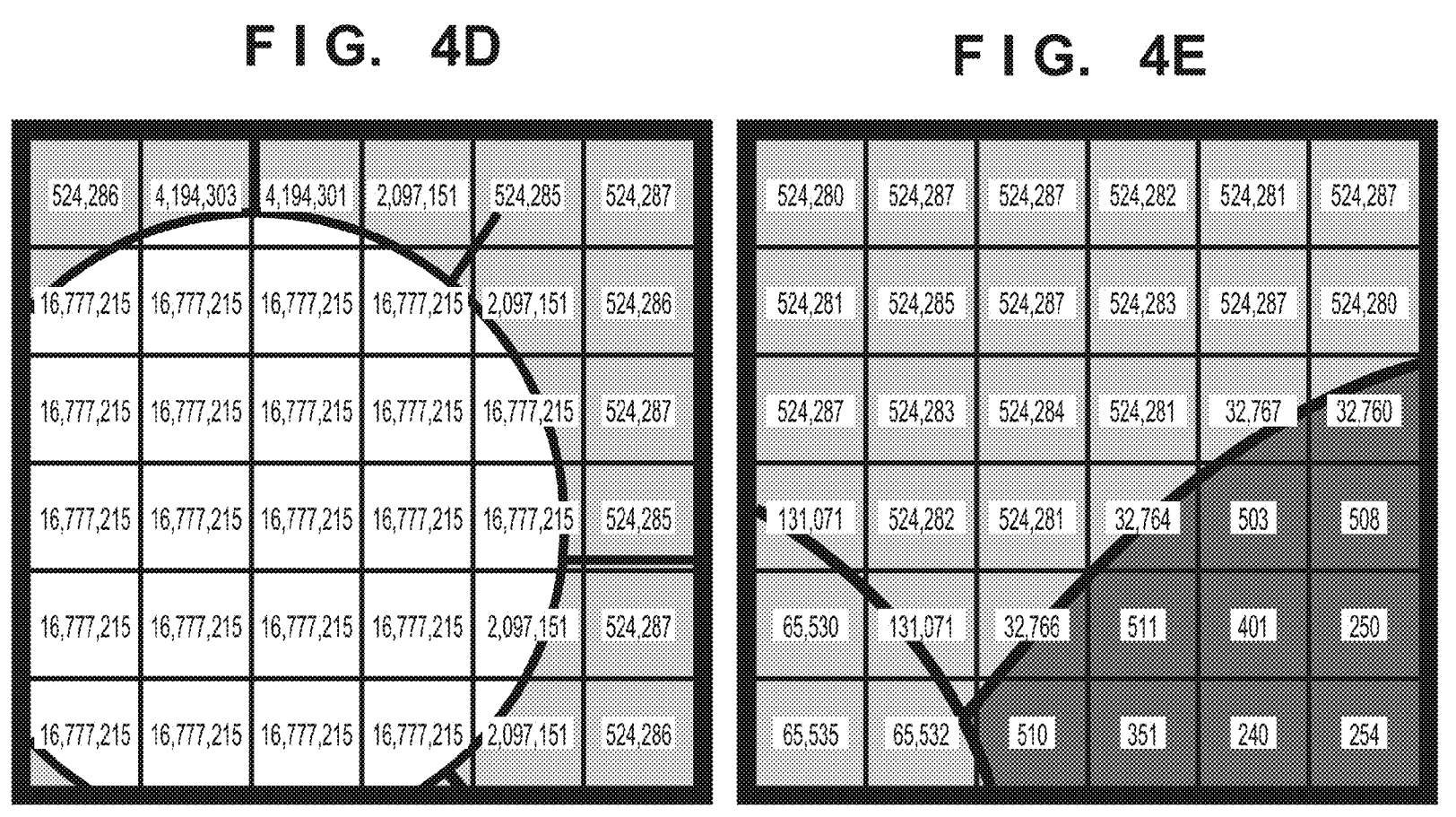

FIG. 4B is a view showing the relationship between the shooting scene and the pixels of the photometric sensor 107. The photometric sensor 107 is assumed to have 36 horizontal pixels×24 vertical pixels=864 pixels. FIGS. 4D and 4E show partial pixel outputs in the thick frames of the image data shown in FIG. 4C.

For example, as can be seen from FIGS. 4A and 6, the pixel output of the mountain portion (BV 1) is 255, the pixel output of the face portion (BV 9) is 65,535, and the pixel output of the sky portion (BV 12) is 524,287. The pixel output of the sun portion (BV 20) is 16,777,215 corresponding to BV 17. The output is saturated, and photometry cannot correctly be performed. However, the value falls outside the photometry range (BV −5 to BV 15) required of the image capturing apparatus, and processing can be performed without any problem in object recognition of step S205 and brightness averaging of step S206 to be described later.

In the next calculations of steps S202 to S207, 14-bit data (0 to 16,383) of a predetermined data amount is extracted from the 24-bit high dynamic range image acquired in step S201, and various kinds of calculations are performed. To do photometry within the photometry range (BV −5 to BV 15) required of the image capturing apparatus, a dynamic range of 20 steps is necessary. In many scenes, however, the brightness difference in a screen is 14 steps or less. For this reason, appropriate processing can be executed by extracting appropriate 14-bit data (compressed data) in correspondence with 24-bit data of a linear value.

The BV value is a log (logarithm) value. To the contrary, a pixel output is a linear value and changes in powers of 2. That is, an increase/decrease of one step in the log value corresponds to an increase/decrease of one bit in the linear value. In addition, an increase/decrease of one bit in the linear value can be expressed by bit shift. That is, extraction of 14 bits corresponding to 24 bits is expressed by bit shift.

For example, to extract 14 steps from BV 0 to BV 14 (pixel outputs of 64 to 2,097,151), the pixel outputs are converted into 0 to 16,383 by 6-bit shift. However, a pixel output of 2,097,152 or more still includes 14 bits even after bit shift and need therefore be clipped to 16,383.

In addition, object recognition of step S205 and brightness averaging of step S206 to be described later are performed using 14-bit data obtained by compressing 24-bit data, thereby decreasing the calculation amount. This can reduce the circuit scale and shorten the processing time.

A method of deciding an appropriate bit shift amount will be described below concerning steps S202 and S203. In step S202, the camera microcomputer 101 generates the histograms of the most significant bits of pixel outputs of the image data.

Figure 7:
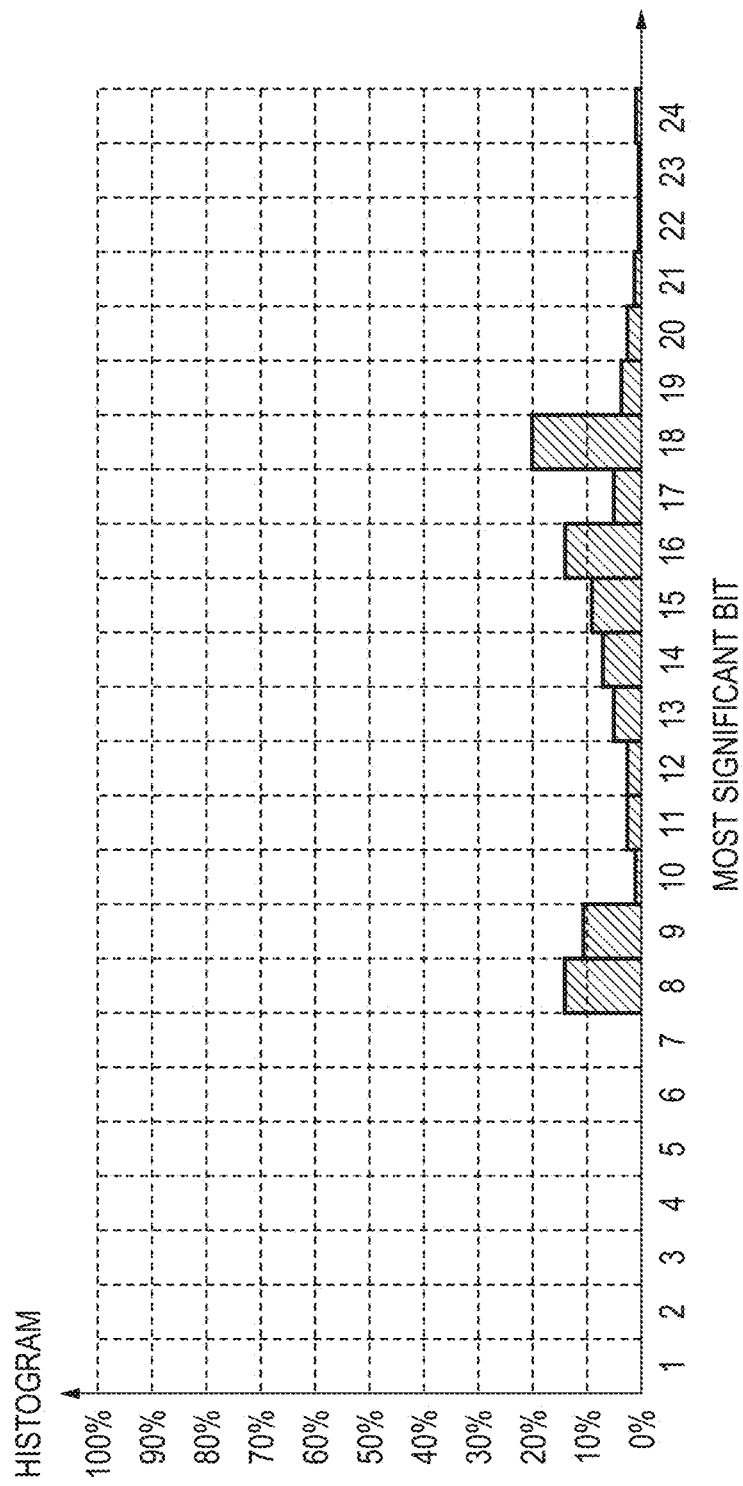
FIG. 7 is a view showing the histograms of most significant bits according to the first embodiment.

FIG. 6 is a view showing the corresponding relationship between the pixel outputs of the photometric sensor 107 and most significant bits. FIGS. 4F and 4G show the most significant bits of the pixel outputs in FIGS. 4D and 4E, respectively. The most significant bits of the mountain portion (255) are 8 bits, the most significant bits in the face portion (65,535) are 16 bits, the most significant bits in the sky portion (524,287) are 18 bits, and the most significant bits in the sun portion (16,777,215) are 24 bits, which are counted as the most significant bits. The histograms of most significant bits as shown in FIG. 7 are generated for the image data shown in FIG. 4A.

In step S203, the camera microcomputer 101 decides the bit shift amount of the image from the histograms calculated in step S202. An example of calculation of deciding the bit shift amount will be described.

Figure 8:
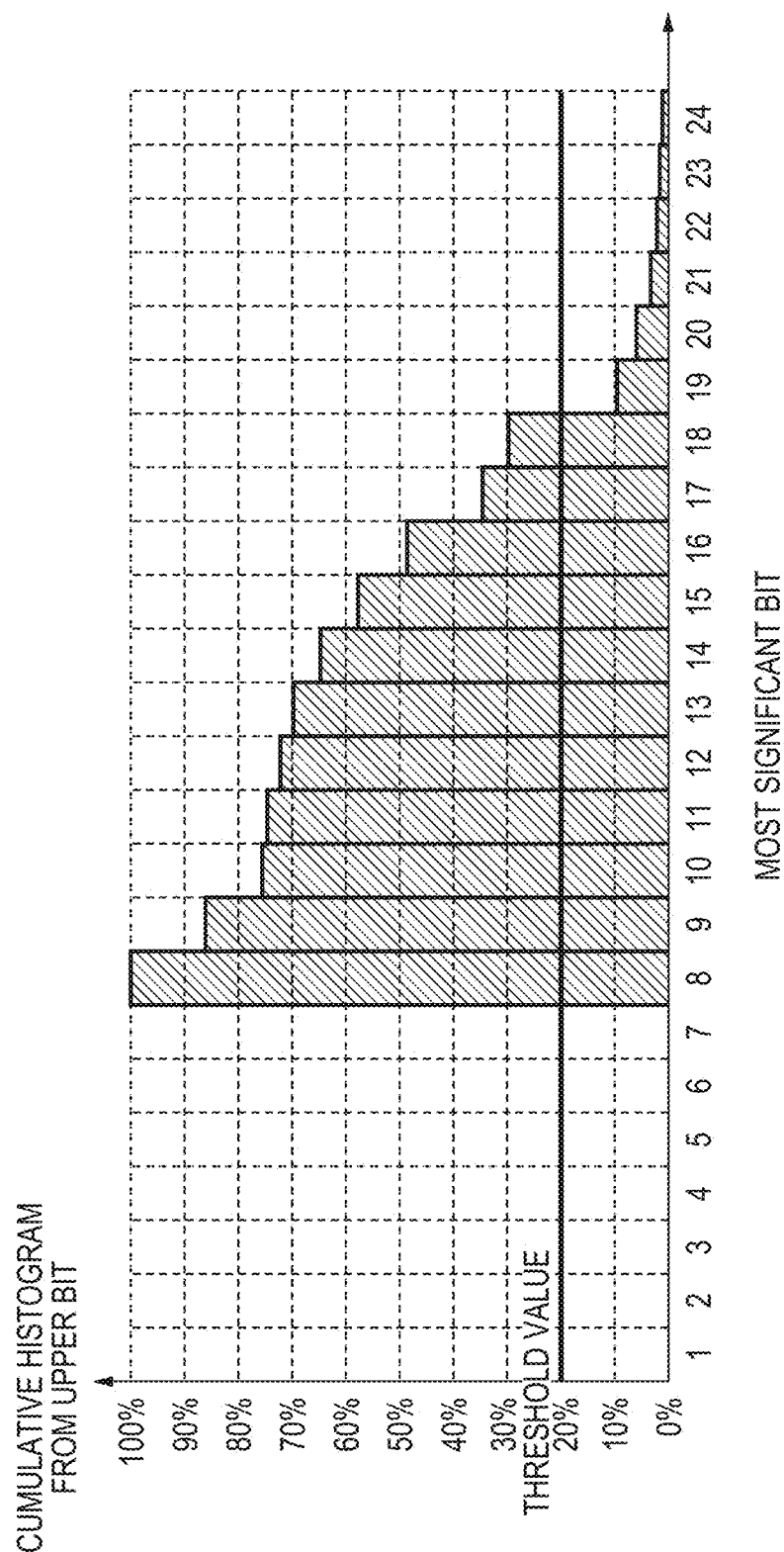
FIG. 8 is a view for explaining a bit shift amount deciding method according to the first embodiment.

First, the cumulative histograms from the upper bits of the histograms are calculated. FIG. 8 shows the cumulative histograms from the upper bits of the histograms shown in FIG. 7. Next, most significant bits whose cumulative histogram exceeds a predetermined threshold are obtained. In the example of FIG. 8, when the threshold is 20%, the most significant bits (to be referred to as most significant bits more than the threshold hereinafter) whose cumulative histogram exceeds the threshold are 18 bits.

Next, a bit shift amount by which the most significant bits more than the threshold become a predetermined output when the 24-bit data is compressed into a predetermined data amount is decided. Here, an example in which 24-bit data (0 to 16,777,215) is compressed into 14-bit data (0 to 16,383) will be explained. A bit shift amount by which a predetermined output of 13 bits is obtained after the most significant bits more than the threshold, that is, 18 bits of 24-bit data are compressed into 14-bit data is decided.

The bit shift amount is obtained by $$(\text{bit shift amount}) = \text{Max}\{(\text{most significant bits more than threshold}) - (\text{predetermined output bits}), 0\} \quad (1)$$

From equation (1), the bit shift amount is 5 bits.

In step S204, the camera microcomputer 101 compresses the image data into the predetermined data amount using the bit shift amount decided in step S203. However, if the data amount exceeds the predetermined data amount even after bit shift, the resultant data is clipped to the predetermined data amount.

Figure 9:
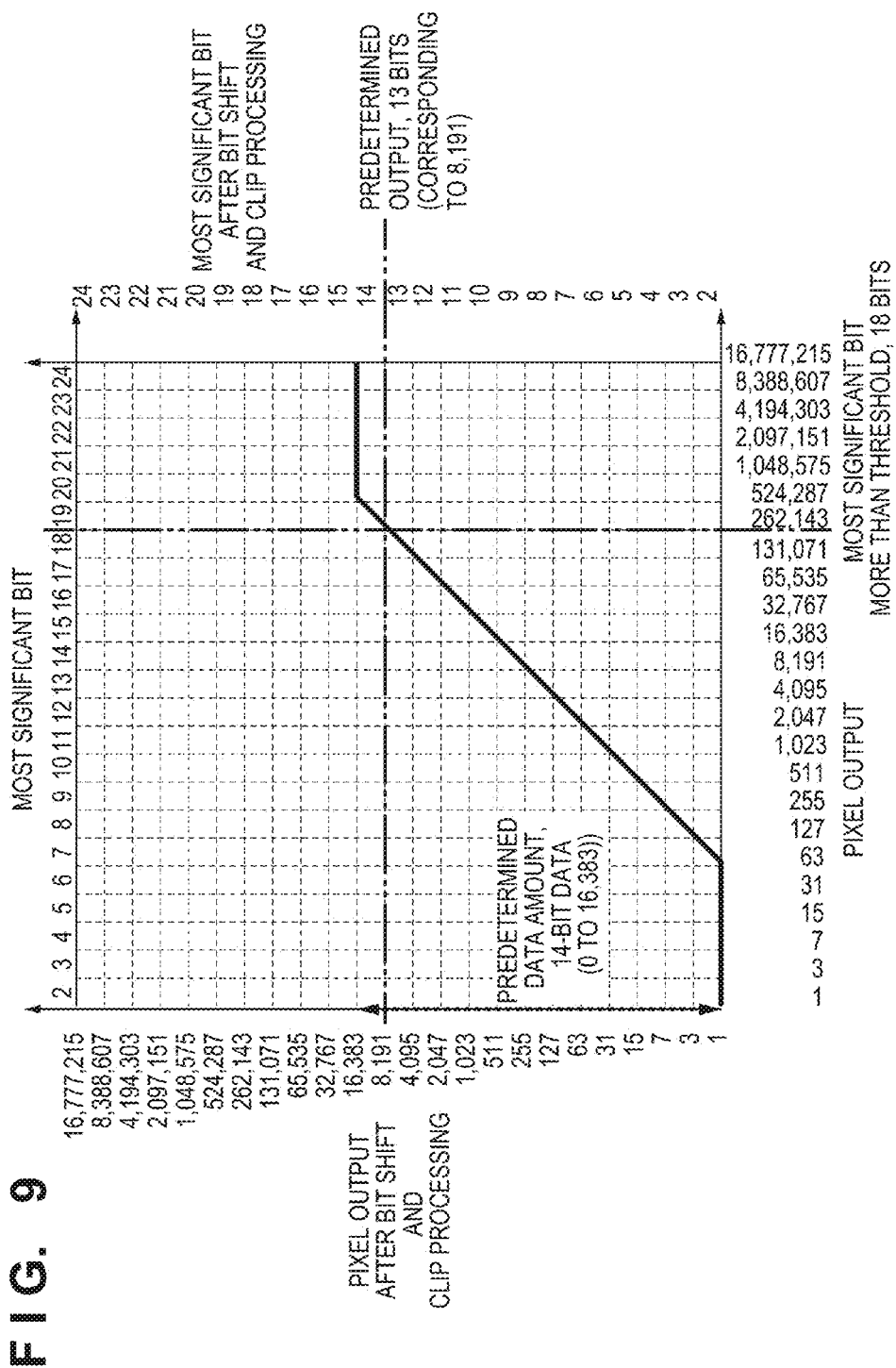
FIG. 9 is a view for explaining a method of compressing a pixel output into a predetermined data amount.

FIG. 9 shows an example in which 24-bit data (0 to 16,777,215) is compressed into 14-bit data (0 to 16,383) of the predetermined data amount. The abscissa represents the pixel output and most significant bits, and the ordinate represents the pixel output and most significant bits after bit shift processing and clip processing are performed in step S204. The bit shift amount is 5 bits. FIGS. 4H and 4I show outputs obtained by shifting the data shown in FIGS. 4D and 4E by 5 bits, respectively.

As is apparent from FIGS. 9 and 4A to 4J, when the pixel output of 65,535 (most significant bits are 16 bits) in the face portion is shifted by 5 bits, 2,047 is obtained. When the pixel output of 16,777,215 (most significant bits are 24 bits) is shifted by 5 bits, 524,287 is obtained. This falls outside the range of the predetermined data amount of 14 bits (0 to 16,383) and is therefore clipped to 16,383.

In step S205, the camera microcomputer 101 performs known object recognition processing using the image data of the predetermined data amount generated in step S204. In this object recognition processing, light source determination processing (AWB) of determining the light source for illuminating the object, feature color extraction processing of extracting a feature color such as a flesh color, tracking processing of tracking the object by a method such as block matching, face recognition processing of extracting a feature region such as a face, and the like are performed. Note that the above-described processes executed in the object recognition processing are not directly relevant to the present invention, and a detailed description thereof will be omitted.

In step S206, the camera microcomputer 101 performs brightness averaging calculation using the image data of the predetermined data amount generated in step S204. For example, the pixels of the photometric sensor 107 are divided into 6 horizontal areas×4 vertical areas=24 areas each corresponding to one block including 6 vertical pixels×6 horizontal pixels, as shown in FIG. 4J. A photometric output value Y of each area is calculated using the 14-bit image data calculated in step S204.

A weighted average value Yw of the photometric output value Y of each area and an exposure control value weighting coefficient k (to be described later) is calculated by $$Yw = \Sigma Yij \times kij \qquad (2)$$

where Yij and kij represent the photometric output value Y and the exposure control value weighting coefficient k of each area, respectively, and i is the area number in the horizontal direction and j is the area number in the vertical direction. The number of additions changes depending on the number of area divisions.

The exposure control value weighting coefficient k is a coefficient used to change the weighting of the photometric output value of each photometry area in accordance with the image capturing mode and the photometry mode of the camera body 100 or a shooting scene. For example, if the photometry mode is a center photometry mode, weighting coefficients in the photometry areas near the center of the image are set to be larger than those on the periphery of the image. In addition, if the image capturing apparatus has a feature region detection function, and an image capturing mode using the feature region detection function is set, weighting coefficients in photometry areas corresponding to feature regions are set to be larger than those in the other photometry areas.

If the image capturing apparatus has a scene determination function of automatically determining the type of a shooting scene in accordance with the state of the field, weighting coefficients optimum for the determined scene are set for the photometry areas. The exposure control value weighting coefficient k is not directly relevant to the embodiment, and a more detailed description thereof will be omitted.

In step S207, the camera microcomputer 101 converts the bit shift amount according to Yw calculated in step S204. In the example of FIGS. 4A to 4J, Yw is multiplied by $2^5$ of the bit shift amount of 5 bits and thus returned to a value corresponding to the output of 24-bit data.

The camera microcomputer 101 calculates the exposure control values (for example, time value, aperture value, and film speed value) for final shooting based on the object brightness (photometric value) obtained from the accumulation time and the weighted average value Yw that has undergone conversion processing according to the bit shift amount. Note that since a method of deciding the exposure control values is not directly relevant to the embodiment, and an arbitrary method can be employed, a detailed description thereof will be omitted. For example, a method of obtaining the exposure control values for final shooting based on the obtained photometric value and a program diagram stored in the memory 102 in advance is usable.

With the above-described method, it is possible to perform appropriate photometric calculation processing while compressing various kinds of calculation amounts. The first embodiment has been described above.

Second Embodiment

The flash light-emitting amount decision method of a camera according to the second embodiment of the present invention will be described next. Note that the arrangement of an image capturing apparatus according to the second embodiment is the same as the arrangement of the camera shown in FIG. 1.

Figure 10:
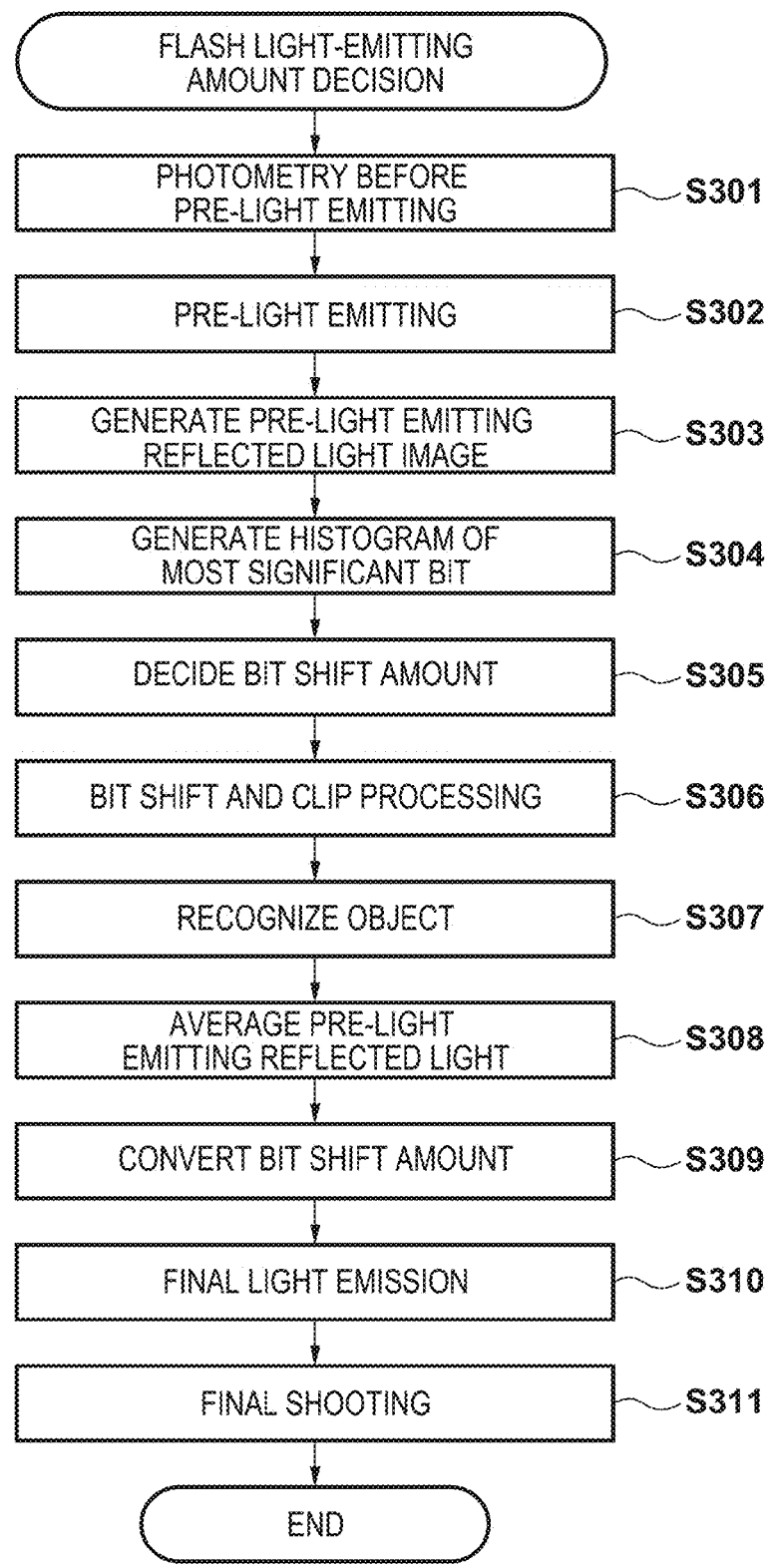
FIG. 10 is a flowchart for explaining shooting processing according to the second embodiment.

The operations of a camera body 100 and a flash 300 will be described with reference to the flowchart of FIG. 10. Note that only the operation in flash photography will be explained here.

In step S301, a camera microcomputer 101 generates image data immediately before pre-light emitting and holds it in a memory 102. In step S302, the camera microcomputer 101 performs pre-light emitting, generates image data at the time of pre-light emitting, and holds it in the memory 102.

In step S303, the camera microcomputer 101 obtains reflected light image data by subtracting the image data before pre-light emitting from the image data at the time of pre-light emitting. Image data of only flash light excluding the influence of outside light can thus be obtained. This image data is held in the memory 102.

In step S304, the camera microcomputer 101 generates the histograms of the most significant bits of the image data acquired in step S302 or S303. This processing is the same as that of step S202 of the first embodiment, and a detailed description thereof will be omitted.

In step S305, the camera microcomputer 101 decides the bit shift amount of the image from the histograms calculated in step S304. This processing is the same as that of step S203 of the first embodiment, and a detailed description thereof will be omitted. However, unlike the first embodiment, when deciding the light-emitting amount of the flash, it is necessary to accurately detect a reflected light from an object at a short distance. Hence, the threshold is set lower than in AE processing. This suppresses saturation of the reflected light from the object at the short distance in the image after bit shift.

In step S306, the camera microcomputer 101 compresses the image data acquired in steps S301, S302, and S303 into a predetermined data amount using the bit shift amount decided in step S304. However, if the data amount exceeds the predetermined data amount even after bit shift, the resultant data is clipped to the predetermined data amount. This processing is the same as that of step S204 of the first embodiment, and a detailed description thereof will be omitted.

In step S307, the camera microcomputer 101 performs known object recognition processing using the image generated in step S306. In this object recognition processing, feature color extraction processing of extracting a feature color such as a flesh color, face recognition processing of extracting a feature region such as a face, and the like are performed. Note that the above-described processes executed in the object recognition processing are not directly relevant to the present invention, and a detailed description thereof will be omitted.

In step S308, the camera microcomputer 101 performs reflected light averaging calculation using the image data generated in step S306. As in the first embodiment, a weighted average value Ys of a photometric output value Y of each area and a light-emitting amount control value weighting coefficient ks (to be described later) is calculated. This processing is the same as that of step S206 of the first embodiment, and a detailed description thereof will be omitted.

In step S309, the camera microcomputer 101 converts the bit shift amount according to Ys calculated in step S308. This processing is the same as that of step S207 of the first embodiment, and a detailed description thereof will be omitted.

In step S310, the camera microcomputer 101 performs logarithmic conversion of the pre-light emitting reflected light brightness value Ys that has undergone conversion processing according to the bit shift amount based on a logarithmic conversion table prepared in the memory 102 in advance, and obtains a pre-light emitting reflected light brightness value Yslog after logarithmic conversion. A difference DF from an appropriate brightness value Yt (logarithm), that is, DF=Yslog−Yt is obtained from the resultant pre-light emitting reflected light brightness value Yslog. A light-emitting amount ANSWER of final light emission is decided from the difference DF (the step difference between the brightness in pre-light emitting and the appropriate brightness) and the pre-light emitting amount.

$$\text{ANSWER}=(\text{pre-light emitting amount})+DF \quad (4)$$

The light-emitting amount ANSWER of final light emission is sent to the camera microcomputer 101, and the light-emitting amount is sent from the camera microcomputer 101 to a flash microcomputer 301.

Finally in step S311, the camera microcomputer 101 issues a light emission instruction to the flash microcomputer 301, and the flash microcomputer 301 controls a light amount control device 302 to execute final light emission and perform final shooting. The second embodiment has been described above.

With the above-described method, it is possible to perform appropriate photometric calculation processing while compressing various kinds of calculation amounts even in a state in which the object brightness widely ranges from a low brightness to a high brightness.

Two preferred embodiments of the present invention have been described above. The invention is not limited to the embodiments, and various changes and modifications can be made within the spirit and scope of the present invention. For example, in the two embodiments described above, an example of an exposure control apparatus having an image capturing function like an image capturing apparatus has been described. However, it may be an exposure control apparatus without the image capturing function. In the exposure control apparatus without the image capturing function, exposure control values are calculated based on image data input from an external device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-213982, filed Oct. 20, 2014, which is hereby incorporated by reference herein in its entirety.

What is claimed is:

1. An exposure control apparatus comprising:
   an acquisition unit including a plurality of pixels that are arranged two-dimensionally, and configured to acquire image data; and
   at least one processor or circuit that performs the operations of the following units:
   a compression unit configured to compress the image data and generate compressed data;
   a calculation unit configured to calculate a first photometric value based on the compressed data;
   a conversion unit configured to convert the first photometric value into a second photometric value corresponding to the image data before the compression; and
   an exposure control unit configured to perform exposure control based on the second photometric value.

2. The apparatus according to claim 1, wherein the image data is image data that has undergone processing for expanding a dynamic range as compared to a dynamic range of said acquisition unit.

3. The apparatus according to claim 1, wherein said compression unit compresses the image data using bit shift processing and clip processing.

4. The apparatus according to claim 3, wherein said conversion unit converts the first photometric value into the second photometric value by adding an amount processed by the bit shift processing to the first photometric value.

5. The apparatus according to claim 3, wherein said compression unit decides a shift amount of the bit shift processing based on a histogram of a most significant bit of the image data.

6. The apparatus according to claim 5, wherein said compression unit sets the shift amount of the bit shift processing such that the most significant bit whose cumulative histogram from an upper bit of the image data exceeds a predetermined threshold becomes a predetermined output.

7. The apparatus according to claim 6, wherein said compression unit changes the predetermined threshold in accordance with a shooting mode.

8. The apparatus according to claim 1, wherein said calculation unit divides the plurality of pixels of said acquisition unit into a plurality of regions, and weights the compressed data for each of the plurality of regions, thereby calculating the first photometric value.

9. The apparatus according to claim 1, wherein said acquisition unit acquires the image data after optical correction of a photographing lens.

10. The apparatus according to claim 1, wherein the compression unit converts pixel outputs of the plurality of pixels to bit data and compresses the image data to generate the compressed data such that most significant bits of the bit data exceeding a threshold value become a predetermined output after the compression operation has been performed.

11. The apparatus according to claim 10, wherein the conversion unit converts the first photometric value into a second photometric value by converting the compressed bit data to the pixel outputs.

12. The apparatus according to claim 11,
wherein the first photometric value is a logarithm value, and
wherein the second photometric value is a linear vale.

13. An image capturing apparatus comprising:
an acquisition unit including a plurality of pixels that are arranged two-dimensionally, and configured to acquire image data; and
at least one processor or circuit that performs the operations of the following units:
a compression unit configured to compress the image data and generate compressed data;
a calculation unit configured to calculate a first photometric value based on the compressed data;
a conversion unit configured to convert the first photometric value into a second photometric value corresponding to the image data before the compression;
an exposure control unit configured to perform exposure control based on the second photometric value; and
an image capturing unit configured to capture an object image under exposure control by said exposure control unit.

14. A control method of an exposure control apparatus including an acquisition unit including a plurality of pixels that are arranged two-dimensionally, and configured to acquire image data, comprising:
compressing the image data and generating compressed data;
calculating a first photometric value based on the compressed data;
converting the first photometric value into a second photometric value corresponding to the image data before the compression; and
performing exposure control based on the second photometric value.

15. A non-transitory computer-readable storage medium storing a program that causes a computer to execute each step of a control method of an exposure control apparatus including an acquisition unit including a plurality of pixels that are arranged two-dimensionally, and configured to acquire image data, the control method comprising:
compressing the image data and generating compressed data;
calculating a first photometric value based on the compressed data;
converting the first photometric value into a second photometric value corresponding to the image data before the compression; and
performing exposure control based on the second photometric value.

* * * * *